3,177,177
ORGANOPOLYSILOXANE RUBBER STABILIZED WITH TUNGSTEN TRIOXIDE
William J. Bobear, Latham, N.Y., assignor to General Electric Company, a corporation of New York
No Drawing. Original application Apr. 11, 1960, Ser. No. 21,141, now Patent No. 3,098,836, dated July 23, 1963. Divided and this application Oct. 1, 1962, Ser. No. 227,575
3 Claims. (Cl. 260—37)

This application is a division of my copending application, Serial No. 21,141, filed April 11, 1960, now Patent No. 3,098,836, and assigned to the same assignee as the present invention.

The present invention relates to improved organopolysiloxane rubber compositions and to a method for making them. More particularly, the present invention relates to a method of producing organopolysiloxane rubber compositions having improved heat-age resistance by incorporating certain metallic compounds into organopolysiloxanes, and to the resulting rubber compositions produced thereby.

Organopolysiloxane rubber compositions are generally recognized as being more temperature resistant and less subject to decomposition than the more conventional types of synthetic-organic or natural rubbers. A serious problem that has troubled industry is that organopolysiloxane rubber compositions often become brittle and lose many of their desirable qualities after extensive use at elevated temperatures. Heat-aging of organopolysiloxane rubber compositions can be reduced by incorporating into the polymer effective amounts of red iron oxide during the manufacturing stages. As a result, the useful life of organopolysiloxane rubber compositions has been substantially increased.

While red iron oxide has improved the heat-age resistance of organopolysiloxane rubber compositions, it has a vivid red color and must be incorporated into the organopolysiloxane rubber composition in relatively high amounts to be an effective heat-age additive. As a result it is virtually impossible to successfully tint organopolysiloxane rubber compositions containing iron oxide to a variety of attractive shades to improve the appearance of the cured product because the red color of the iron oxide is too dominant.

It has now been discovered that by incorporating into organopolysiloxanes an effective amount of a metallic compound in the form of a certain metal oxide such as tungsten oxide, or nickel oxide, markedly improved readily tintable rubber compositions are produced that exhibit superior resistance to heat-aging. In addition to enhancing the heat-age resistance of organopolysiloxane rubber compositions, the compounds included within the scope of the present invention as heat-age additives are substantially neutral in color.

An effective amount of a heat-age additive is an amount sufficient to impart to a cured organopolysiloxane rubber sample an improved resistance to heat-aging as compared to samples containing no heat-age additive. Heat-age causes an alteration in the desirable physical properties of an organopolysiloxane polymer at temperatures above 150° C. over an extended period of time.

In accordance with the present invention, there are provided organopolysiloxane rubber compositions having improved resistance to heat-aging comprising (1) 100 parts of an organopolysiloxane convertible to the cured, solid, elastic state, (2) 10 to 200 parts of a filler, (3) and an effective amount of a metallic oxide selected from nickel oxide and tungsten oxide, said organopolysiloxane having a viscosity of at least one hundred thousand centipoises when measured at 25° C., the organo radicals of said organopolysiloxane being members selected from the class of monovalent hydrocarbon radicals, halogenated monovalent hydrocarbon radicals, and cyanoalkyl radicals, said organo radicals being attached to silicon by carbon-silicon linkages, there being an average of about 1.98 to 2.01 organo radicals per silicon atom.

Of the metallic oxides that can be employed in the practice of the present invention, tungsten trioxide ($WO_3$), is preferred. Tungsten oxide and nickel oxide (NiO) have been found to be effective in the range of from about 0.8 to 20 parts by weight calculated as metal, per 100 parts of organopolysiloxane polymer, while a preferred range is about 0.8 to about 8 parts calculated as metal per 100 parts of polymer.

The fillers that are employed in the organopolysiloxane rubber compositions, are known to the art as reinforcing, and semi-reinforcing fillers. The reinforcing fillers, such as the silica fillers, including fumed silica, precipitated silica and the like, are structure inducing and depending on their manufacture, may contain or be free of hydroxyl groups either in the form of adsorbed moisture or bonded to silicon atoms. These structure inducing silicone rubber fillers may be modified such as, for example, by the introduction of silicon-bonded alkoxy groups in place of some hydroxyl groups, resulting in some advantages as decreased structure when incorporated with a convertible organopolysiloxane composition.

The preferred silica filler of the present invention is a fumed silica filler made by fuming processes including the vapor phase burning of silicon tetrachloride or ethyl silicate, an example being what is known to the trade as Cab-O-Sil. Since a fumed silica contains a relatively low degree of moisture, it is particularly valuable as a filler additive in organopolysiloxane rubber which is to be used in electrical applications. Examples of other silica reinforcing fillers may be found described in U.S. Patents 2,541,137, 2,610,167 and 2,657,149. Such fillers may be slightly acidic or alkaline (that is, have pH's below or above 7) depending upon the method of manufacture, such as by an aerogel process. Examples of semi-reinforcing or usually non-structure forming type, are titanium oxide, lithopone, calcium carbonate, iron oxide and diatomaceous earth.

Although the convertible organopolysiloxanes employed in the practice of the present invention are well known in the art, attention is directed to the convertible organopolysiloxanes disclosed in Agens Patent 2,448,756 and Sprung et al. Patent 2,448,556, the latter two patents being issued September 7, 1948; Sprung Patent 2,484,595, issued October 11, 1949; Krieble et al. Patent 2,457,688, issued December 28, 1948; Marsden Patent 2,521,528, issued September 5, 1950—all the foregoing patents being assigned to the same assignee as the present invention; Hyde Patent 2,490,357, issued December 5, 1949; and Warrick Patent 2,541,137, issued February 13, 1951. It will, of course, be understood by those skilled in the art that the convertible organopolysiloxanes referred to herein contain the same or different silicon-bonded organic substituents (e.g., methyl, ethyl, propyl, vinyl, allyl, phenyl, tolyl, xylyl, benzyl, phenylethyl, naphthyl, chlorophenyl, cyanoethyl, both methyl and phenyl, etc., radicals) connected to the silicon atoms by carbon-silicon linkages.

The particular convertible organopolysiloxanes used are not critical and may be any one of those described in the foregoing patents. They may be viscous masses or gummy solids depending upon the state of condensation of the starting organopolysiloxanes, polymerizing agent, etc., and may be prepared by condensation of a liquid organopolysiloxane containing an average of about 1.95, preferably from about 1.98 to about 2.01 organic groups per silicon atom. The polymerizing agents that can be employed are well known in the art and can include, for instance, ferric chloride hexahydrate, phenyl phosphoryl chloride; alkaline condensing agents such as potassium hydroxide, sodium hydroxide, etc. Each convertible organopolysiloxane generally comprises a polymeric diorganosiloxane which can contain, if desired, for example, up to 2 mole percent copolymerized monoorganosiloxane, for example, copolymerized monomethylsiloxane and a small molar (e.g., less than 1 mole) percent of triorganosiloxy units, e.g., trimethylsiloxy units. Generally, it is preferred to use as the starting liquid organopolysiloxanes (or mixtures of organopolysiloxanes) from which the convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl, e.g., methyl groups.

The starting organopolysiloxanes used to make the convertible organopolysiloxanes advantageously comprise organic constituents consisting essentially of monovalent organic radicals attached to silicon by carbon-silicon linkages, and in which essentially all of the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane can be one in which all the siloxane units are $(CH_3)_2SiO$, or the siloxane can be a copolymer of dimethylsiloxane with a minor amount (e.g., from 1 to 20 or more mole per cent) of any of the following units, separately or mixtures thereof: $(C_6H_5)(CH_3)SiO$ and $(C_6H_5)_2SiO$. The presence of halogen, e.g., chlorine, atoms on the phenyl nucleus is also within the purview of the present invention.

Where alkenyl groups are attached to silicon by carbon-silicon linkages, it is preferable that the alkenyl groups (for instance, vinyl groups, allyl groups, etc.) be present in an amount equal to from 0.05 to 2 mole percent of the total number of silicon-bonded organic groups in the convertible organopolysiloxane.

Various curing agents to effect more rapid conversion of the convertible organopolysiloxane to the cured, solid, elastic state can be incorporated. Among such curing agents can be mentioned, for instance, benzoyl peroxide, tertiary butyl perbenzoate, bis-(2,4-dichlorobenzoyl) peroxide, etc. These curing agents (or "vulcanization accelerators" as they are often designated) can be present in amounts ranging from about 0.1 to as high as 4 to 8 percent or more, by weight, based on the weight of the convertible organopolysiloxane. High energy electron irradiation without curing agents can also be employed for vulcanizing purposes.

The metallic oxide can be incorporated into the convertible organopolysiloxane polymer in any desired manner. It is preferred to add the metallic oxide to the polymer in finely divided form such as to a particle size in the range of 50 microns or below to avoid modifying the properties desired in the final cured rubber product. The metallic oxide can be added directly into the organopolysiloxane polymer, into the polymer and filler mixture or, if desired, can be added along with the filler into the polymer. It is advisable to add the metallic oxide to the organopolysiloxane prior to the addition of the curing catalyst to avoid undersirable side effects and to achieve optimum results.

Addition of a suitable curing catalyst can be preformed at any stage of the processing but it is preferred to add it after mixing the organopolysiloxane polymer with the filler and the metallic oxide. Thereafter, the composition can be molded or used in any application desired. When molding the curable organopolysiloxane composition, pressures from about 100 to 2,000 p.s.i. or more may be employed in combination with temperatures ranging from about 80° C. to 200° C. or higher. Under such conditions, the time required for effecting the desired cure will depend upon such factors as the type of curing agent, concentration thereof, the type of polymer, amount of filler, the use desired, etc., Persons skilled in the art will have little difficulty in determining the optimum conditions under various situations involving different temperatures, proportions and ingredients.

In order that those skilled in the art may better understand how the present invention can be practiced, the following examples are given by way of illustration and not by way of limitation. All parts are by weight.

EXAMPLE 1

A convertible organopolysiloxane within the scope of the present invention was made as follows.

Ninety-eight parts by weight of octamethylcyclotetrasiloxane, 2 parts of 1,3,5,7-tetramethyl-1,3,5,7-tetravinylcyclotetrasiloxane and 0.001 part of potassium hydroxide were heated at a temperature of about 155° C. with agitation for about 4 hours to obtain a highly viscous, benzene soluble mass of only slight flow. This convertible organopolysiloxane polymer had a viscosity of about 6 million centistokes and a ratio of about 1.98 methyl groups, and about 0.02 vinyl group per silicon atom.

One hundred parts of the above convertible organopolysiloxane and 8 parts of diphenylsilanediol were placed in a doughmixer and a mixture of 40 parts of fumed silica and 4 parts of tungsten metal in the form of tungsten trioxide were gradually added. After the formulation was mixed for 1 hour at 110 to 115° C., 2 parts of benzoyl peroxide was added. When the resulting composition had aged for 24 hours, it was milled to a sheet. Test strips were then cut which were press-cured for 1 hour at 150° C., and post-cured 24 hours at 250° C. Additional test strips were made following the same procedure that contained 20 parts of tungsten metal. The test strips were then heat-aged for an additional 24 hours at 315° C.

EXAMPLE 2

The procedure of Example 1 was repeated except that 4 parts of nickel in the form of nickel oxide were employed in preparing suitable test strips that were heat-aged for 24 hours at 315° C.

Control strips were also made in accordance with the above procedure, that contained 5 parts of red iron oxide per 100 parts of organopolysiloxane polymer. In addition, control strips were made that were free of a heat-age additive.

The test strips were press-cured and conditioned for 24 hours at 250° C., and then measured in accordance with A.S.T.M. specifications as shown in the table below. Hardness "H" (Shore A), tensile strength "T" (p.s.i.), and elongation "E" (percent), were determined. After initial measurements were taken, the test strips were subjected to an additional heat treatment by placing them in an oven for 24 hours at about 315° C. Measurements were again taken to determine whether the properties of the strips were altered due to the possible effects of heat-aging. The parts by weight of metallic oxide in the table are expressed in terms of parts by weight of metal per 100 parts of organopolysiloxane polymer.

Table

| Heat-Age Additive | Parts | Cured 24-Hrs/250°C | | | Heat-Aged 24-Hrs/315°C | | |
|---|---|---|---|---|---|---|---|
| | | H | T | E | H | T | E |
| None | | 56 | 938 | 310 | (1) | (1) | (1) |
| Iron Oxide | 5 | 56 | 838 | 310 | 71 | 570 | 190 |
| Tungsten Oxide | 4.0 | 55 | 1,013 | 300 | 60 | 630 | 270 |
| Do | 20.0 | 57 | 670 | 250 | 72 | 490 | 100 |

[1] Too brittle to test.

The above table clearly shows the effectiveness of the substantially color-free metal oxides of the present invention in imparting improved heat-age resistance to organopolysiloxane rubber compositions as compared to red iron oxide. The samples prepared in accordance with Example 2, employing nickel oxide were also found to have substantially improved resistance to heat-aging as compared to the sample containing no heat-age additive.

While the foregoing examples have of necessity been limited to only a few of the very many variables within the scope of the present invention, it should be understood that the present invention covers a much broader class of organopolysiloxane compositions containing the metal oxides included within the scope of the present invention. All of these various materials are prepared by methods specifically illustrated in the examples above and described further in the foregoing description of the present invention.

What I claim as new and desire to secure by Letters Patent of the United States is:

1. A process for producing an organopolysiloxane rubber composition having improved resistance to heat-aging comprising mixing together by weight, (1) 0.8 to 20 parts of tungstein metal in the form of an oxide of tungsten consisting essentially of tungsten trioxide, (2) 100 parts of an organopolysiloxane, (3) 10 to 200 parts of a filler, (4) and a curing catalyst, and curing the resulting composition at temperatures in the range of 80 to 200° C., said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

2. Organopolysiloxane compositions comprising by weight, (1) 100 parts of an organopolysiloxane, (2) 10 to 200 parts of a filler, and (3) 0.8 to 20 parts of tungsten metal in the form of an oxide of tungsten consisting essentially of tungsten trioxide, said organopolysiloxane having a viscosity of at least 100,000 centipoises when measured at 25° C., the organo radicals of said organopolysiloxane being members selected from the class consisting of monovalent hydrocarbon radicals, halogenated monovalent hydrocarbon radicals and cyanoalkyl radicals, there being an average of about 1.98 to 2.01 organo radicals per silicon atom.

3. A composition in accordance with claim 2 containing about 4 parts of tungsten metal in the form of tungsten trioxide.

References Cited by the Examiner
UNITED STATES PATENTS 2,830,034  4/58  Rundquist _____ 260—45.75

FOREIGN PATENTS 566,946  12/58  Canada.
1,110,410  7/61  Germany.

OTHER REFERENCES

"Silicone Rubber, Its Growth and Recent Developments" (Servais et al.), The Rubber and Plastics Age, vol. 38, pages 600–608 (July 1957).

MORRIS LIEBMAN, *Primary Examiner.*
ALEXANDER H. BRODMERKEL, *Examiner.*